Sept. 10, 1929.      F. S. FORNEY ET AL      1,727,760

SHEARS

Filed Jan. 20, 1928

INVENTORS
Frank S. Forney and
John Brzezinski,
BY Howard D. Smith,
Their ATTORNEY Patented Sept. 10, 1929.

1,727,760

UNITED STATES PATENT OFFICE.

FRANK S. FORNEY, OF NILES, AND JOHN BRZEZINSKI, OF WARREN, OHIO, ASSIGNORS OF ONE-FOURTH TO WILLIAM H. FORNEY, OF NILES, OHIO.

SHEARS.

Application filed January 20, 1928. Serial No. 248,096.

This invention relates to new and useful improvements in snips or shears.

It is one of the principal objects of our invention to provide snips or shears that will cut successfully any tough material such as card board, fiber board or sheet metal; in fact, anything that is not of a brittle nature, nor has the form of tempered steel. Heavier shears will cut heavier materials, and lighter ones, such as a small pair for domestic purposes, will cut with ease paper or cloth.

It is another object of our invention to provide shears or snips which are so shaped and spaced that they will cut easily and cleanly at a desired angle or upon a desired curve, different materials of a thickness up to 16 gauge steel.

Another object of the invention is to provide a pair of snips or shears whose tips are so constructed that they will efficiently perform their cutting operations where the quarters are very close.

Other important and incidental objects will be brought out in the following specification and particularly set forth in the subjoined claims.

Figure 1:
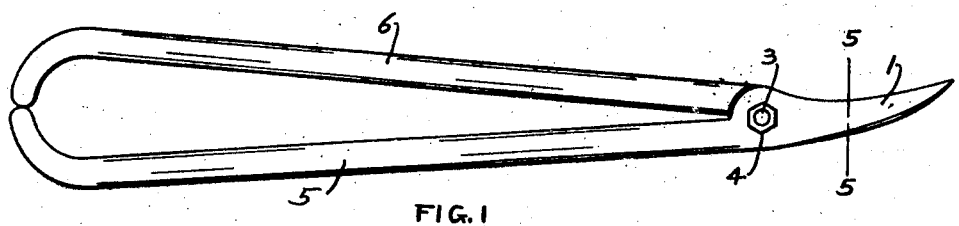
Figures 2, 3, 4:
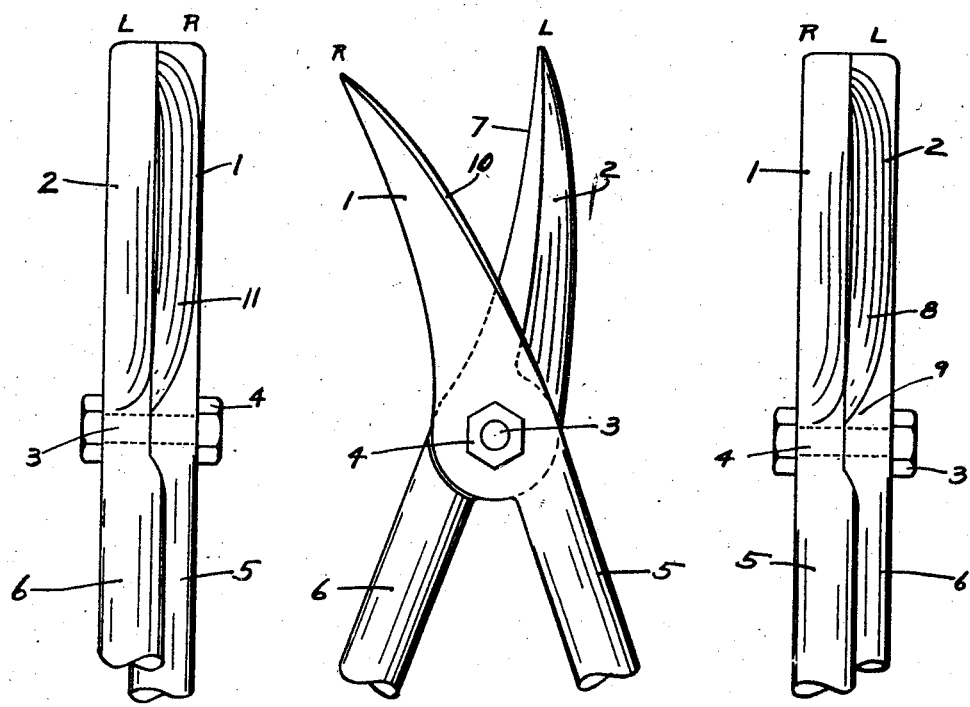
Figure 5:
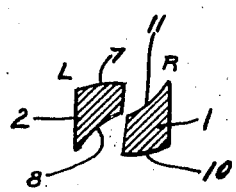

In the accompanying drawings illustrating our invention, Figure 1 is a side elevational view of our snips or shears. Figure 2 is a side elevational view of the shearing portions of the snips, showing the direction of taper of the cutting edge on the high side of the left or lower blade. Figure 3 is a front elevational view of the shears, showing the taper on the top of the right or upper blade. Figure 4 is a rear elevational view of the shears, showing the taper on the bottom of the lower blade running from the right side of the blade to a high point on the left side or outside of the snips. And Figure 5 is a cross sectional view taken through the shears on the line 5—5 of Figure 1.

Referring to the accompanying drawings for a detailed descripton of our invention, the numerals 1 and 2 designate the right and left or upper and lower blades respectively of a pair of hand snips or shears. These blades are connected by pivot means such as the bolt 3 and nut 4 to permit them to be freely operated by integral handle portions 5 and 6. These handle portions have curved ends that are half round at their meeting points to prevent the pinching of the hand or fingers when using the shears.

The blades 1 and 2 are formed in the following manner to enable them to cut with ease, at any angle or upon any circle desired, card board, sheet metal, cloth or like material which is not brittle nor has the form of tempered steel.

The left or lower blade 2, as shown in Figure 2, is formed on its top portion with a cutting edge 7 that tapers from left to right on the high side of the blade or inside of the shears. The bottom portion of the blade 2, as shown in Figure 2, is formed with a pronounced taper 8 that extends from its right side to a high point 9 on its left side, or outside of the shears.

The right or upper blade 1 is just the reverse of the left blade, its cutting edge 10 being on the bottom and slightly tapered from right to left with the high side or cutting edge on the inside of the snips. (See Figure 2.) As shown by Figure 3, the right blade 1 has on its top a taper 11 which is similar to the taper 8 on the bottom of the lower blade 2. In other words, each one of the blades is constructed with a tapering concave side. This particular shape of blade permits sharp angles and curves to be cut by them without bending the cut edge of the material.

The taper of the cutting edges and shape of the blades, together with the space between them as shown in Figures 3, 4 and 5, eminently adapt them for cutting easily and cleanly, at a desired angle or upon a desired curve, anything that is not of a brittle nature, nor has the form of tempered steel. The tips of the blades are chisel shaped as illustrated in the drawings to enable them to be used to cut materials at very close quarters. These chisel shaped points also permit the shears to be used in cutting material which has all of its outer edges secured down. Thus a cut can be started at any point in the material by making a hole in it with the chisel points of the blades and then cutting from this hole. Nor will the material be damaged in so doing, such as tearing it when beginning a cut from a point other than on an edge of the material.

We do not wish to be limited to the details of construction herein shown and described, and any changes or modifications may be made therein within the scope of the subjoined claims.

Having described our invention, we claim:

1. Shears of the class described, including pivoted blades, the lower blade having a cutting edge on its top portion that tapers from left to right on its high side, together with a taper running from the right side of its bottom portion to a high point on its left side, and the upper blade having on its bottom portion a cutting edge that tapers from right to left, together with a taper on its top portion that is similar to the taper on the bottom part of the lower blade, said blades terminating in chisel shaped ends.

2. Shears of the class described, including longitudinally curved blades pivotally connected, the lower blade having a cutting edge on its top portion, the upper blade having a cutting edge on its bottom portion and tapered chisel points on the outer ends of said blades for a purpose specified.

In testimony whereof we have hereunto set our hands this 17 day of January, 1928.

FRANK S. FORNEY.
JOHN BRZEZINSKI.